(12) United States Patent
Choi et al.

(10) Patent No.: US 10,032,260 B2
(45) Date of Patent: Jul. 24, 2018

(54) INVERSE DISTORTION RENDERING METHOD BASED ON A PREDICTED NUMBER OF SURFACES IN IMAGE DATA

(71) Applicant: Samsung Electronics Co., Ltd., Gyeonggi-do (KR)

(72) Inventors: Woosung Choi, Gyeonggi-do (KR); Jungeun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/039,223

(22) PCT Filed: Jan. 5, 2015

(86) PCT No.: PCT/KR2015/000071
§ 371 (c)(1),
(2) Date: May 25, 2016

(87) PCT Pub. No.: WO2015/102451
PCT Pub. Date: Jul. 9, 2015

(65) Prior Publication Data
US 2017/0161880 A1    Jun. 8, 2017

(30) Foreign Application Priority Data

Jan. 6, 2014 (KR) .................... 10-2014-0001538

(51) Int. Cl.
*G06T 5/00* (2006.01)
*G06T 3/00* (2006.01)
(Continued)

(52) U.S. Cl.
CPC ............ *G06T 5/006* (2013.01); *G06T 3/0031* (2013.01); *G06T 3/0056* (2013.01); *G06T 15/10* (2013.01);
(Continued)

(58) Field of Classification Search
CPC ..... G06T 3/0018; G06T 3/005; G06T 19/006; G06T 2210/36; G02B 27/017–27/0176; G02B 2027/0174; G02B 2027/0178
See application file for complete search history.

(56) References Cited

U.S. PATENT DOCUMENTS

| 6,288,689 B1 | 9/2001 | Shikama |
| 2001/0005185 A1 | 6/2001 | Endo et al. |

(Continued)

FOREIGN PATENT DOCUMENTS

| KR | 1020040056489 | 7/2004 |
| KR | 1020100001608 | 1/2010 |

OTHER PUBLICATIONS

Bimber, Oliver, et al. "Real-time view-dependent image warping to correct non-linear distortion for curved Virtual Showcase displays." Computers & Graphics 27.4 (2003): 515-528.*

(Continued)

*Primary Examiner* — Daniel Hajnik
(74) *Attorney, Agent, or Firm* — The Farrell Law Firm, P.C.

(57) ABSTRACT

A method and electronic device for processing an image in an electronic device. The method includes predicting the number of surfaces which can be partitioned in image data; determining an inverse distortion rendering method corresponding to the predicted number of surfaces as a method for inverse distortion rendering of the image data; rendering the image data to a distorted image based on the determined inverse distortion rendering method; and displaying the distorted image.

13 Claims, 7 Drawing Sheets

(51) Int. Cl.
*G06T 15/10* (2011.01)
*H04N 13/04* (2006.01)
(52) U.S. Cl.
CPC ....... *H04N 13/044* (2013.01); *G06T 2200/04* (2013.01)

(56) References Cited

U.S. PATENT DOCUMENTS

| | | | |
|---|---|---|---|
| 2004/0135744 A1* | 7/2004 | Bimber | G02B 27/0093 345/32 |
| 2007/0268316 A1 | 11/2007 | Kajita et al. | |
| 2010/0303293 A1* | 12/2010 | Caduff | G06F 3/011 382/103 |
| 2011/0122149 A1 | 5/2011 | Souchard | |
| 2012/0057053 A1 | 3/2012 | Mallon et al. | |
| 2013/0141360 A1* | 6/2013 | Compton | G06F 1/1632 345/173 |

OTHER PUBLICATIONS

PCT/ISA/210 Search Report issued on PCT/KR2014/000071 (pp. 3), dated Feb. 23, 2015.
PCT/ISA/237 Written Opinion issued on PCT/KR2014/000071 (pp. 3), dated Feb. 23, 2015.
Jannick P. Rolland et al., "A Method of Computational Correction for Optical Distortion in Head-Mounted Displays", Technical Report, Dec. 31, 1993, 14 pages.
European Search Report dated Jul. 12, 2017 issued in counterpart application No. 15733107.5-1903, 8 pages.

* cited by examiner

[Fig. 1]
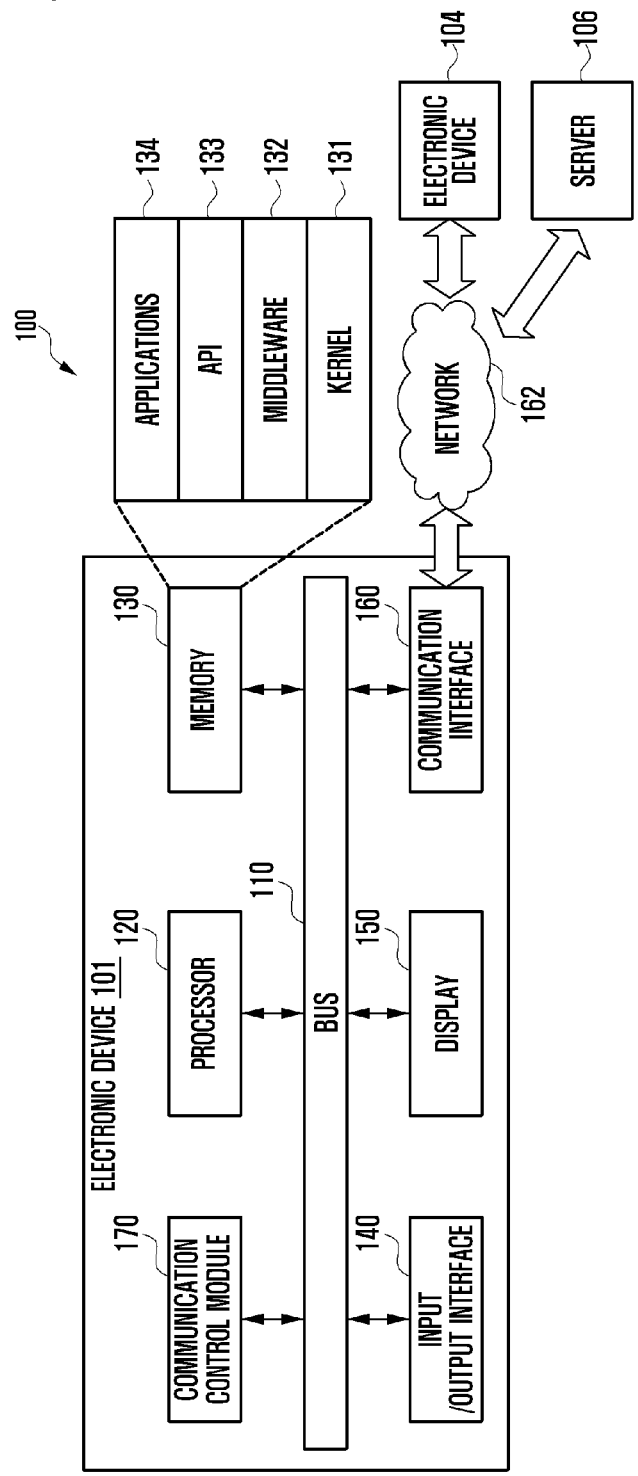

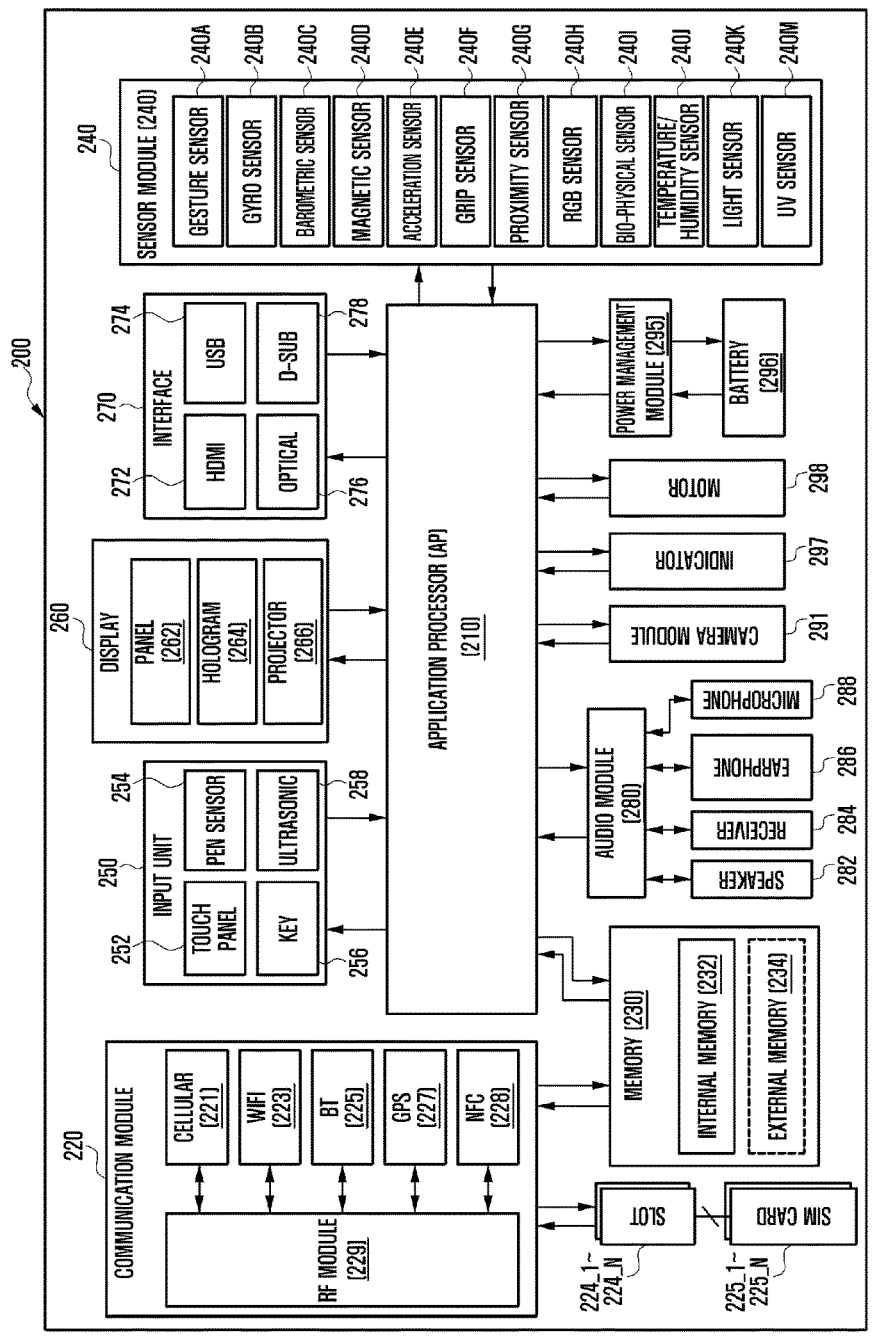
[Fig. 2]
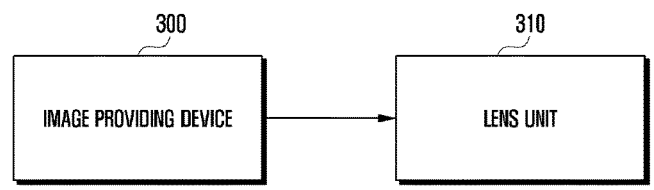
[Fig. 3]

[Fig. 4]
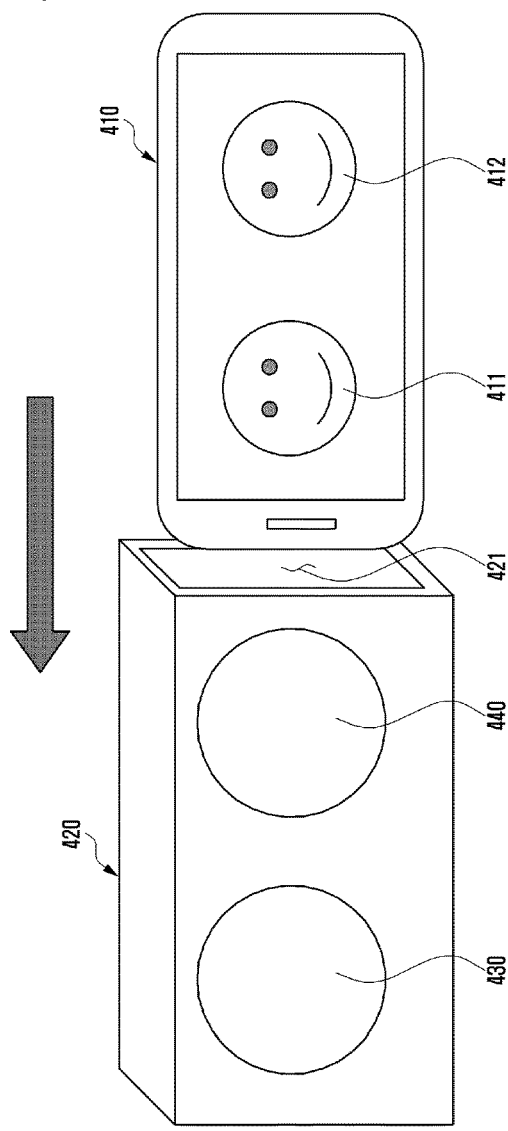
[Fig. 5a]
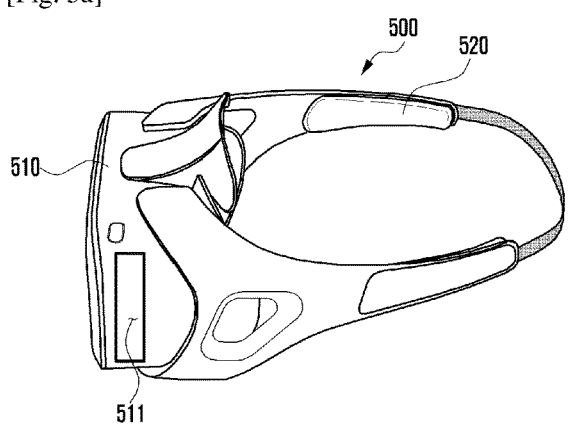

[Fig. 5b]
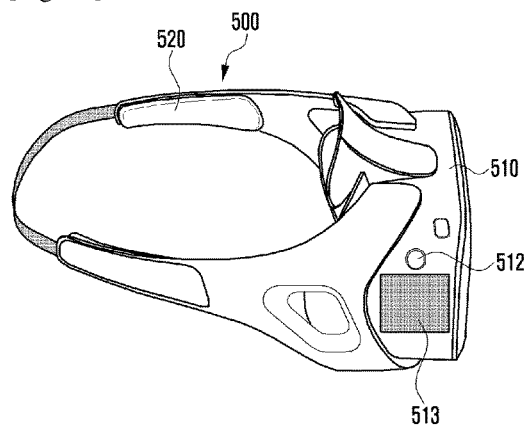
[Fig. 6]
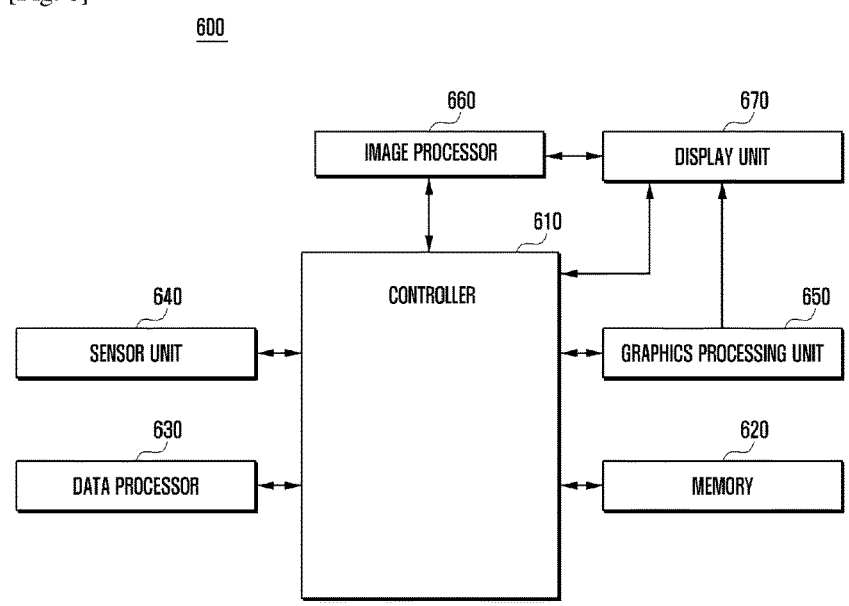
[Fig. 7a]
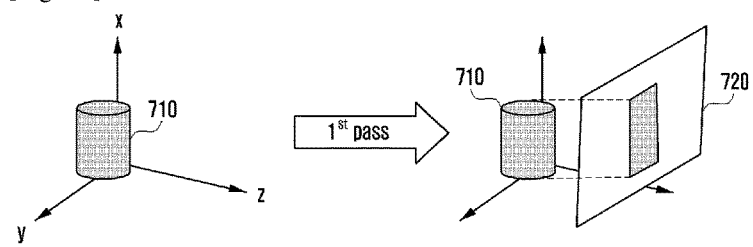
[Fig. 7b]
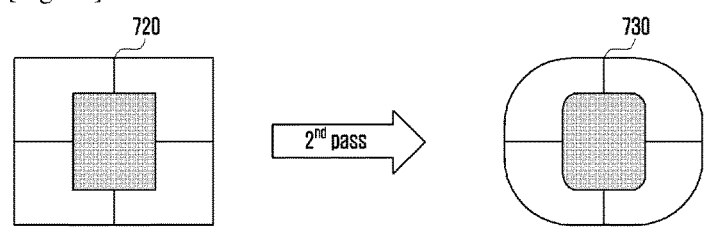

[Fig. 7c]
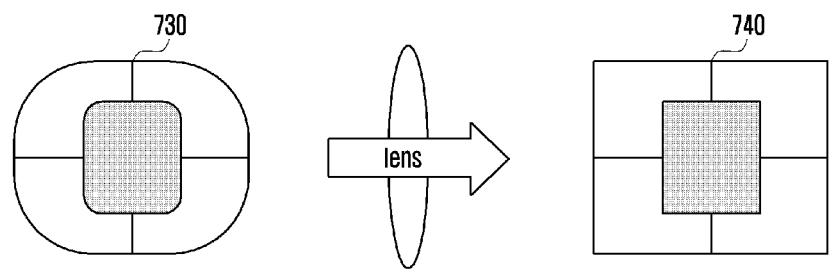
[Fig. 8a]
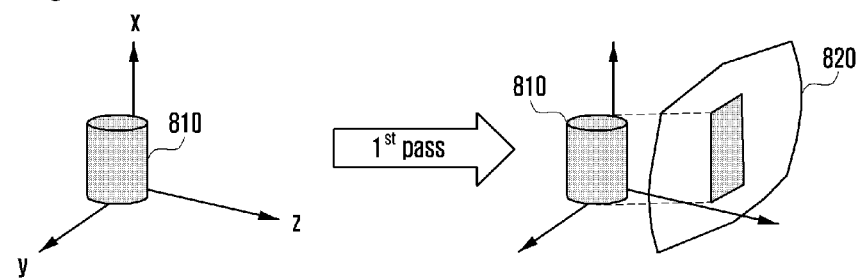
[Fig. 8b]
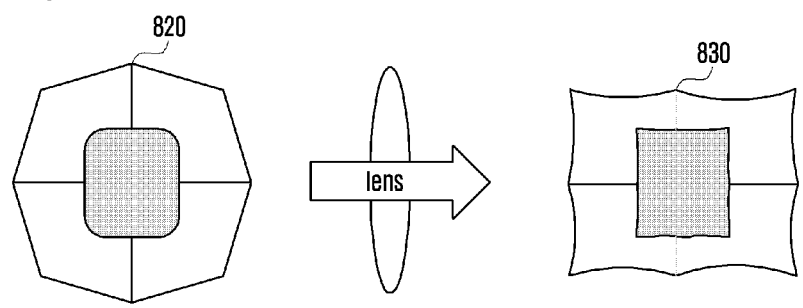

[Fig. 9]
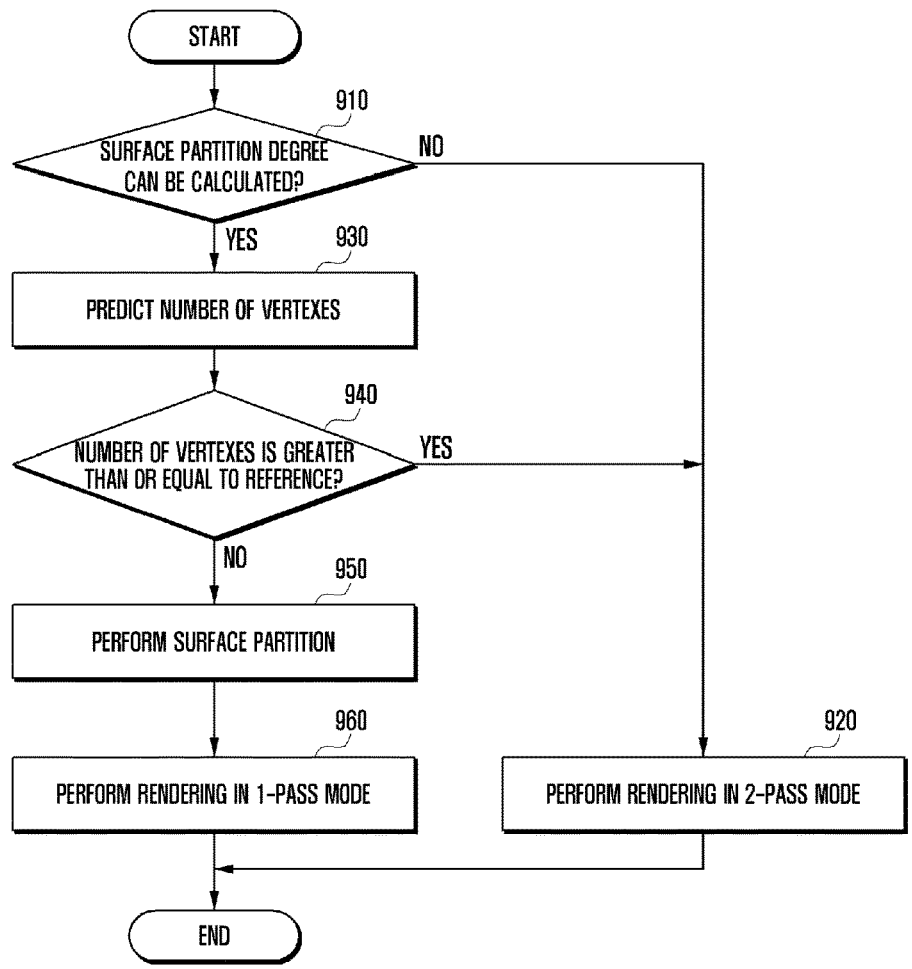
[Fig. 10a]
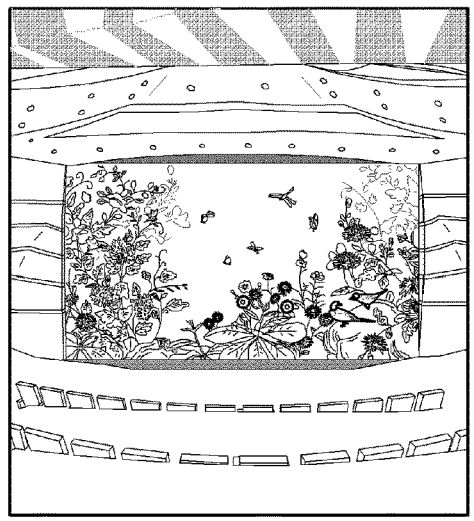

[Fig. 10b]
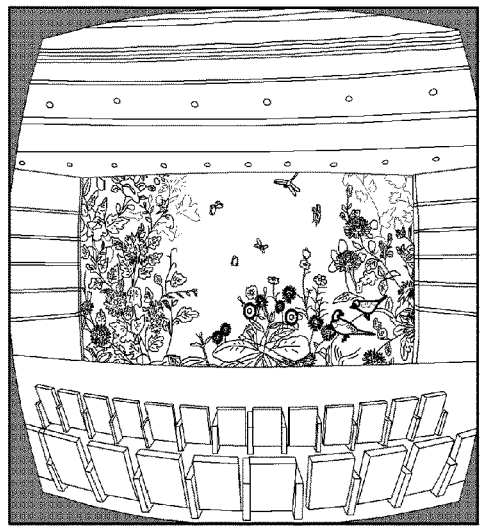
[Fig. 11a]
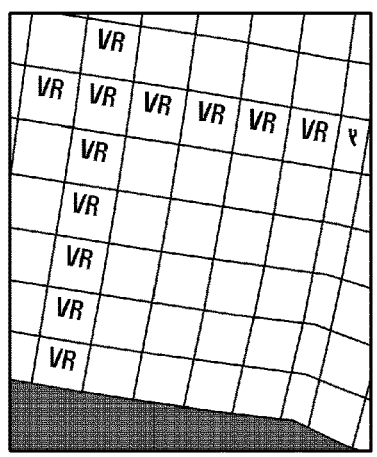
[Fig. 11b]
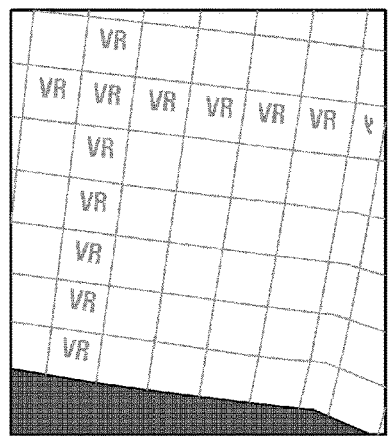

INVERSE DISTORTION RENDERING
METHOD BASED ON A PREDICTED
NUMBER OF SURFACES IN IMAGE DATA

This application is a National Phase Entry of PCT International Application No. PCT/KR2015/000071, which was filed on Jan. 5, 2015, and claims priority to Korean Patent Application No. 10-2014-0001538, which was filed on Jan. 6, 2014, the contents of each of which are incorporated herein by reference.

TECHNICAL FIELD

The present invention relates generally to an electronic device for displaying an image to a user and a method of processing the image, and more particularly, to an electronic device for displaying an image to a user and a method of processing the image by predicting the number of surfaces which can be partitioned in image data and determining an inverse distortion rendering method corresponding to the predicted number of surfaces.

BACKGROUND ART

A Head Mounted Device (HMD) is an electronic device in the form of glasses or a helmet and may include a display unit and a lens. The HMD provides an extra large screen to a user by disposing the display unit just in front of the user's eyes and is useful for providing a realistic virtual world since the screen moves along with the user's movement. In the HMD, a lens unit is generally disposed on a front part of the screen (that is, between the user's eyes and the display unit) to make the screen of the display unit look bigger so that the user can receive an image through the lens unit.

A lens unit included in a Head Mounted Device (HMD) distorts an image provided to a display unit and provides the distorted image to a user, and the user views the distorted image through the lens unit. In order to correct the distortion by the lens, an electronic device may process image data to a distorted image (for example, a convex image) (that is, perform inverse distortion rendering) and display the distorted image. Then, the user may receive an original image which the electronic device intended to provide through the lens unit. A conventional inverse distortion rendering method may include a 2-pass rendering process. For example, the inverse distortion rendering method may include a process of primarily rendering 3D image data to a 2D image and a process of secondarily rendering the 2D image to an inverse distorted image. The inverse distorted image is converted to a flat image by the lens and shown to the user. Since image data, such as a camera image, which is two dimensionally produced and stored requires only the secondary rendering process In the related art, an inverse distorted image is generated in the unit of pixels, and thus requires the secondary rendering process. In the secondary rendering process, a pixel which has been rendered once is re-calculated, so that degradation of image quality may be generated in an edge portion which is seriously distorted. Further, power consumption may increase as the rendering is performed twice. Particularly, in a 3D game or when a screen is updated through the recognition of a user's motion, calculations for the rendering may further increase. Thus the HMD directly worn on the user's eyes may encounter problems related to large amounts of heat due to the increase in power consumption.

Various embodiments of the present disclosure may provide an image processing method and an electronic device implementing the same which can reduce power consumption and degradation of image quality when the inverse distortion rendering method is performed.

DISCLOSURE OF INVENTION

Technical Problem

The present invention has been made to address the above-mentioned problems and disadvantages, and to provide at least the advantages described below. Accordingly, an aspect of the present invention provides an inverse distortion rendering of 2D image data such as a camera image at high speed and low power consumption as compared to 3D image data.

Solution to Problem

In accordance with an aspect of the present invention, a method of processing an image in an electronic device is provided. The method includes predicting the number of surfaces which can be partitioned in image data; determining an inverse distortion rendering method corresponding to the predicted number of surfaces as a method for inverse distortion rendering of the image data; rendering the image data to a distorted image based on the determined inverse distortion rendering method; and displaying the distorted image.

In accordance with another aspect of the present invention, an electronic device is provided. The electronic device includes a memory for storing image data; a processor configured to predict the number of surfaces which can be partitioned in the image data, determine an inverse distortion rendering method corresponding to the predicted number of surfaces as a method for inverse distortion rendering of the image data, and render the image data to a distorted image based on the determined inverse distortion rendering method; and a display unit for displaying the distorted image.

In accordance with another aspect of the present invention, a non-transitory computer-readable recording medium including a program for executing a process is provided. The process includes predicting the number of surfaces which can be partitioned in image data; determining an inverse distortion rendering method based on the predicted number of surfaces; rendering the image data to a distorted image based on the determined inverse distortion rendering method; and displaying the distorted image.

Advantageous Effects of Invention

The present disclosure may provide an image processing method and an electronic device implementing the same which can reduce power consumption and degradation of image quality when the inverse distortion rendering method is performed.

BRIEF DESCRIPTION OF DRAWINGS

The above and other aspects, features and advantages of the present invention will be more apparent from the following detailed description, taken in conjunction with the accompanying drawings, in which:

FIG. 1 is a block diagram of a network environment including an electronic device according to an embodiment of the present invention;

FIG. 2 is a block diagram of an electronic device according to an embodiment of the present invention;

FIG. 3 is a block diagram of an image providing device and a lens unit according to an embodiment of the present invention;

FIG. 4 illustrates an image providing device and a holder to which the image providing device can be mounted according to an embodiment of the present invention;

FIGS. 5a and 5b are a left side view and a right side view of an HMD according to an embodiment of the present invention, respectively;

FIG. 6 is a block diagram of an image providing device according to an embodiment of the present invention;

FIGS. 7a to 7c are illustrations of a 2-pass rendering method according to an embodiment of the present invention;

FIGS. 8a and 8b are illustrations of a 1-pass rendering method according to an embodiment of the present invention;

FIG. 9 is a flowchart illustrating an image processing method according to an embodiment of the present invention;

FIGS. 10a and 10b illustrate a 1-pass inverse distortion rendering result; and

FIGS. 11a and 11b illustrate a 2-pass inverse distortion rendering result.

MODE FOR THE INVENTION

Hereinafter, the present invention is described with reference to the accompanying drawings. The present invention may have various embodiments, and modifications and changes may be made therein. Therefore, the present invention will be described in detail with reference to embodiments shown in the accompanying drawings. However, it should be understood that there is no intent to limit the present invention to the particular forms, and the present invention should be construed to cover all modifications, equivalents, and/or alternatives falling within the scope and spirit of the present invention. In describing the drawings, similar elements are designated by similar reference numerals.

As used in the present invention, the expression "include" or "may include" refers to the existence of a corresponding function, operation, or constituent element, and does not limit one or more additional functions, operations, or constituent elements. Further, as used in the present invention, the term such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in the present invention, the expression "or" includes any or all combinations of words enumerated together. For example, the expression "A or B" may include A, may include B, or may include both A and B.

While expressions including ordinal numbers, such as "first" and "second", as used in the present invention may modify various constituent elements, such constituent elements are not limited by the above expressions. For example, the above expressions do not limit the sequence and/or importance of the corresponding constituent elements. The above expressions are used merely to distinguish a constituent element from other constituent elements. For example, a first user device and a second user device indicate different user devices although both are user devices. For example, a first constituent element may be referred to as a second constituent element, and likewise a second constituent element may be referred to as a first constituent element without departing from the scope and spirit of the present invention.

When a component is referred to as being "connected" to or "accessed" by another component, it should be understood that the component may be directly connected to or accessed by the other component, but another component may be interposed between them. Contrarily, when a component is referred to as being "directly connected" to or "directly accessed" by another component, it should be understood that there is no additional component between the component and the other component.

The terms used in various embodiments of the present invention are merely for the purpose of describing the embodiments and are not intended to limit the present invention. Singular forms are intended to include plural forms unless the context clearly indicates otherwise.

Unless defined otherwise, all terms used herein, including technical terms and scientific terms, have the same meaning as commonly understood by a person of ordinary skill in the art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present invention.

An electronic device according to the present invention may be a device including a communication function. For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical appliance, a camera, and a wearable device (e.g., a Head Mounted Device (HMD) such as electronic glasses, electronic clothes, an electronic bracelet, an electronic necklace, an electronic appcessory, electronic tattoos, or a smartwatch).

According to an embodiment of the present invention, the electronic device may be a smart home appliance with a communication function. The smart home appliance as the electronic device, for example, may include at least one of a television, a Digital Video Disc (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™, a game console, an electronic dictionary, an electronic key, a camcorder, and an electronic photo frame.

According to an embodiment of the present invention, the electronic device may include at least one of various medical devices (e.g., Magnetic Resonance Angiography (MRA), Magnetic Resonance Imaging (MRI), Computed Tomography (CT), and ultrasonic machines), navigation equipment, a Global Positioning System (GPS) receiver, an Event Data Recorder (EDR), a Flight Data Recorder (FDR), an automotive infotainment device, electronic equipment for ships (e.g., ship navigation equipment and a gyrocompass), avionics, security equipment, a vehicle head unit, an industrial or home robot, an Automatic Teller Machine (ATM) of a banking system, and a Point Of Sale (POS) in a shop.

According to an embodiment of the present invention, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to the present invention may be a combination of one or more of the aforementioned various devices. Further, the electronic device according to the present invention may be a flexible device. Further, it will be apparent to those skilled in the art that the electronic device according to the present invention is not limited to the aforementioned devices.

Hereinafter, an electronic device according to various embodiments of the present invention will be discussed with reference to the accompanying drawings. The term "a user" as used in an embodiment of the present invention may refer to any person who uses an electronic device or any other device (e.g., an artificial intelligence electronic device) using an electronic device.

FIG. 1 is a block diagram of a network environment 100 including an electronic device 101 according to an embodiment of the present invention.

Referring to FIG. 1, the electronic device 101 includes a bus 110, a processor 120, a memory 130, an input/output interface 140, a display 150, a communication interface 160, and a communication control module 170.

The bus 110 may be a circuit interconnecting the aforementioned components and transmitting communication (e.g., a control message) between the aforementioned components.

The processor 120, for example, receives instructions from the aforementioned components (e.g., the memory 130, the input/output interface 140, the display 150, the communication interface 160, and the communication control module 170) other than the processor 120 via the bus 110, decodes the received instructions, and performs operations or data processing according to the decoded instructions.

The memory 130 stores instructions or data received from or generated by the processor 120 or other components (e.g., the input/output interface 140, the display 150, the communication interface 160, and the communication control module 170). The memory 130 may include programming modules, for example, a kernel 131, middleware 132, an Application Programming Interface (API) 133, and applications 134. Each of the programming modules as described above may be formed by software, firmware, hardware, or a combination of two or more thereof.

The kernel 131 controls or manages system resources (e.g., the bus 110, the processor 120, and the memory 130) used to execute operations or functions implemented in the remaining other programming modules, for example, the middleware 132, the API 133, and the applications 134. Further, the kernel 131 may provide an interface that allows the middleware 132, the API 133, or the applications 134 to access and control or manage individual components of the electronic device 101.

The middleware 132 serves to mediate between the API 133 or the applications 134 and the kernel 131, that is, allow the API 133 or the applications 134 to communicate and exchange data with the kernel 131. Further, the middleware 132 performs control (e.g., scheduling or load balancing) for task requests received from the applications 134 by using, for example, a method of assigning a priority for use of the system resource (e.g., the bus 110, the processor 120, or the memory 130) of the electronic device 101 to at least one of the applications 134.

The API 133 is an interface for allowing the applications 134 to control functions provided by the kernel 131 and the middleware 132, and may include at least one interface or function (e.g., instruction) for, for example, file control, window control, image processing, or text control.

According to an embodiment of the present invention, the applications 134 includes a Short Message Service/Multimedia Message Service (SMS/MMS) application, an e-mail application, a calendar application, an alarm application, a health care application (e.g., an application for measuring the amount of exercise or blood glucose), and an environmental information application (e.g., an application for providing atmospheric pressure information, humidity information, temperature information, and the like). Additionally or alternatively, the applications 134 may include an application associated with information exchange between the electronic device 101 and an external electronic device (e.g., the electronic device 104). The application associated with information exchange, for example, may include a notification relay application for transferring specific information to the external electronic device or a device management application for managing the external electronic device.

For example, the notification relay application may include a function for transferring notification information, generated in another application of the electronic device 101 (e.g., the SMS/MMS application, the e-mail application, the health care application, or the environmental information application), to an external electronic device (e.g., the electronic device 104). Additionally or alternatively, the notification relay application, for example, may receive notification information from an external electronic device (e.g., the electronic device 104) and provide the received notification information to a user. The device management application, for example, may manage (e.g., install, remove, or update) a function for at least a part of an external electronic device (e.g., the electronic device 104) communicating with the electronic device 101 (e.g., a function of turning on/off an external electronic device itself (or some components thereof) or adjusting the brightness (or resolution) of a display), an application running on the external electronic device, or a service provided in the external electronic device (e.g., a calling or messaging service).

According to an embodiment of the present invention, the applications 134 include an application specified according to the attribute (e.g., type) of an external electronic device (e.g., the electronic device 104). For example, when the external electronic device is an MP3 player, the applications 134 include an application associated with music playback. Similarly, when the external electronic device is a mobile medical device, the applications 134 include an application associated with health care. According to an embodiment of the present invention, the applications 134 includes at least one of an application assigned to the electronic device 101 and an application received from an external electronic device (e.g., the server 106 or the electronic device 104).

The input/output interface 140, for example, transfers instructions or data, input from a user via an input/output device (e.g., a sensor, a keyboard, or a touch screen), to the processor 120, the memory 130, the communication interface 160, or the communication control module 170 via the bus 110. For example, the input/output interface 140 may provide the processor 120 with data corresponding to a user's touch input via a touch screen. Further, the input/output interface 140 may, for example, receive instructions or data from the processor 120, the memory 130, the communication interface 160, or the application control module 170 via the bus 110 and output the received instructions or data via the input/output device (e.g., a speaker or a display). For example, the input/output interface 140 may output voice data processed by the processor 120 to a user via a speaker.

The display 150 displays various pieces of information (e.g., multimedia data or text data) to a user.

The communication interface 160 establishes communication between the electronic device 101 and an external electronic device (e.g., the electronic device 104 or the server 106). For example, the communication interface 160 may be connected to the network 162 via wireless or wired communication and thereby communicate with the external device. The wireless communication, for example, may include at least one of Wireless Fidelity (WiFi), Bluetooth (BT), Near Field Communication (NFC), a Global Positioning System (GPS), and cellular communication (e.g., Long Term Evolution (LTE), LTE Advanced (LTE-A), Code Division Multiple Access (CDMA), Wideband CDMA (WCDMA), Universal Mobile Telephone System (UMTS), Wireless Broadband (WiBro), or Global System for Mobile communication (GSM)). The wired communication, for example, may include at least one of a Universal Serial Bus (USB), a High Definition Multimedia Interface (HDMI), Recommended Standard 232 (RS-232), and a Plain Old Telephone Service (POTS).

According to an embodiment of the present invention, the network 162 is a telecommunications network. The telecommunications network may include at least one of a computer network, the Internet, the Internet of things, and a telephone network. According to an embodiment of the present invention, a protocol (e.g., a transport layer protocol, a data link layer protocol, or a physical layer protocol) for communication between the electronic device 101 and an external device is supported by at least one of the applications 134, the application programming interface 133, the middleware 132, the kernel 131, and the communication interface 160.

The communication control module 170 processes at least some pieces of information acquired from other components (e.g., the processor 120, the memory 130, the input/output interface 140, and the communication interface 160) and provides the processed information to a user in various ways. For example, the communication control module 170 may recognize information on connection components provided in the electronic device 101, store the information on connection components in the memory 130, and execute the applications 134, based on the stored information on connection components. Further information of the communication control module 170 is provided below via a description of FIGS. 2 to 9.

FIG. 2 is a block diagram of an electronic device 200 according to an embodiment of the present invention. The electronic device 200, for example, may constitute all or a part of the electronic device 101 shown in FIG. 1.

Referring to FIG. 2, the electronic device 200 includes at least one Application Processor (AP) 210, a communication module 220, at least one Subscriber Identity Module (SIM) card slots 224_1 to 224_N, a memory 230, a sensor module 240, an input module 250, a display 260, an interface 270, an audio module 280, a camera module 291, a power management module 295, a battery 296, an indicator 297, and a motor 298.

The AP 210 drives an operating system or an application program to control a plurality of hardware or software components connected to the AP 210, and performs processing and operations of various data including multimedia data. The AP 210, for example, may be implemented as a System on Chip (SoC). According to an embodiment, the AP 210 may further include a Graphics Processing Unit (GPU).

The communication module 220 (e.g., the communication interface 160) performs data transmission/reception in communication with other electronic devices (e.g., the electronic device 104 and the server 106) connected to the electronic device 200 (e.g., the electronic device 101) via a network. According to an embodiment of the present invention, the communication module 220 includes a cellular module 221, a WiFi module 223, a BT module 225, a GPS module 227, an NFC module 228, and a Radio Frequency (RF) module 229.

The cellular module 221 provides a voice call, a video call, an SMS service, an Internet service, and the like via a communication network (e.g., LTE, LTE-A, CDMA, WCDMA, UMTS, WiBro, or GSM). Also, the cellular module 221 may identify and authenticate an electronic device in a communication network by using, for example, a Subscriber Identification Module (e.g., the SIM card). According to an embodiment of the present invention, the cellular module 221 performs at least some of the functions that may be provided by the AP 210. For example, the cellular module 221 may perform at least a multimedia control function.

According to an embodiment of the present invention, the cellular module 221 includes a Communication Processor (CP). Further, the cellular module 221, for example, may be implemented as a SoC. Although the cellular module 221 (e.g., a CP), the memory 230, the power management module 295, and the like are shown as separate elements from the AP 210 in FIG. 2, the AP 210 may be implemented to include at least some (e.g., the cellular module 221) of the aforementioned elements according to an embodiment of the present invention.

According to an embodiment of the present invention, the AP 210 or the cellular module 221 (e.g., a CP) loads a command or data received from at least one of a non-volatile memory and other elements connected thereto into a volatile memory and processes the loaded command or data. Further, the AP 210 or the cellular module 221 may store data received from or generated by at least one of the other elements in a non-volatile memory.

Each of the WiFi module 223, the BT module 225, the GPS module 227, and the NFC module 228, for example, may include a processor for processing data transmitted or received via the corresponding module. Although the cellular module 221, the WiFi module 223, the BT module 225, the GPS module 227, and the NFC module 228 are shown as separate blocks in FIG. 2, at least some (e.g., two or more) of the cellular module 221, the WiFi module 223, the BT module 225, the GPS module 227, and the NFC module 228 may be included in one integrated circuit, or chip, (IC) or one IC package according to an embodiment of the present invention. For example, at least some of the processors corresponding to the cellular module 221, the WiFi module 223, the BT module 225, the GPS module 227, and the NFC module 228 respectively (e.g., a CP corresponding to the cellular module 221 and a WiFi processor corresponding to the WiFi module 223) may be implemented as one SoC.

The RF module 229 performs data transmission/reception, for example, RF signal transmission/reception. The RF module 229, for example, may include a transceiver, a Power Amplifier Module (PAM), a frequency filter, a Low Noise Amplifier (LNA), and the like. Also, the RF module 229 may further include a component for transmitting/ receiving an electromagnetic wave over the air in wireless communication, such as a conductor or a conducting wire. Although FIG. 2 shows that the cellular module 221, the WiFi module 223, the BT module 225, the GPS module 227, and the NFC module 228 share one RF module 229, at least one of the cellular module 221, the WiFi module 223, the BT module 225, the GPS module 227, and the NFC module 228 may perform RF signal transmission/reception via a separate RF module according to an embodiment of the present invention.

The at least one SIM card 225_1 to 225_N is a card including a Subscriber Identification Module, and is inserted into at least one slot 224_1 to 224_N formed in a position of the electronic device 200. The at least one SIM card 225_1 to 225_N includes unique identification information (e.g., Integrated Circuit Card Identifier (ICCID)) or subscriber information (e.g., International Mobile Subscriber Identity (IMSI)).

The memory 230 (e.g., the memory 130) includes an internal memory 232 or an external memory 234. The internal memory 232, for example, may include at least one of a volatile memory (e.g., a Dynamic RAM (DRAM), a Static RAM (SRAM), or a Synchronous Dynamic RAM (SDRAM)) and a non-volatile memory (e.g., a One-Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, or an NOR flash memory).

According to an embodiment of the present invention, the internal memory 232 is a Solid State Drive (SSD). The external memory 234 may further include a flash drive, for example, a Compact Flash (CF) memory card, a Secure Digital (SD) memory card, a Micro Secure Digital (Micro-SD) memory card, a Mini Secure Digital (Mini-SD) memory card, an extreme Digital (xD) memory card, or a memory stick. The external memory 234 may be functionally connected to the electronic device 200 via various interfaces. According to an embodiment of the present invention, the electronic device 200 may further include a storage device (or storage medium) such as a hard drive.

The sensor module 240 measures a physical quantity or detects an operation state of the electronic device 200 and converts the measured or detected information into an electronic signal. The sensor module 240, for example, may include at least one of a gesture sensor 240A, a gyro sensor 240B, a barometric sensor 240C, a magnetic sensor 240D, an acceleration sensor 240E, a grip sensor 240F, a proximity sensor 240G, a color sensor 240H (e.g., a red, green and blue (RGB) sensor), a bio-physical sensor 240I, a temperature/humidity sensor 240J, a light sensor 240K, and a ultraviolet (UV) sensor 240M. Additionally or alternatively, the sensor module 240, for example, may include an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 240 may further include a control circuit for controlling one or more sensors included therein.

The input module 250 includes a touch panel 252, a (digital) pen sensor 254, a key 256, or an ultrasonic input unit 258. The touch panel 252 that recognizes a touch input, for example, may include at least one of a capacitive touch panel, a resistive touch panel, an infrared touch panel, and an acoustic wave touch panel. Also, the touch panel 252 may further include a control circuit. When the touch panel is a capacitive touch panel, it may recognize a physical contact or a proximity of a physical contact. The touch panel 252 may also include a tactile layer. In this case, the touch panel 252 provides a tactile response to a user.

The (digital) pen sensor 254, for example, may be implemented using a means identical or similar to a means for receiving a touch input from a user or using a separate recognition sheet. The key 256, for example, may include a physical button, an optical key, or a keypad. The ultrasonic input unit 258 is a unit 258 that can identify data by generating an ultrasonic signal via an input tool and detecting a sonic wave through a microphone (e.g., the microphone 288) in the electronic device 200, and is capable of wireless recognition. According to an embodiment of the present invention, the electronic device 200 may also receive a user input from an external device (e.g., computer or server) connected thereto by using the communication module 220.

The display 260 (e.g., the display 150) may include a panel 262, a hologram unit 264, or a projector 266. The panel 262, for example, may be a Liquid Crystal Display (LCD) or an Active Matrix-Organic Light Emitting Diode (AM-OLED). The panel 262, for example, may be implemented to be flexible, transparent, or wearable. The panel 262 may also be incorporated into one module together with the touch panel 252. The hologram unit 264 projects a stereoscopic image into the air by using light interference. The projector 266 displays an image by projecting light onto a screen. The screen, for example, may be located inside or outside of the electronic device 200. According to an embodiment of the present invention, the display 260 may further include a control circuit for controlling the panel 262, the hologram unit 264, or the projector 266.

The interface 270, for example, may include a High Definition Multimedia Interface (HDMI) 272, a Universal Serial Bus (USB) 274, an optical interface 276, or a D-subminiature (D-sub) connector 278. The interface 270, for example, may be included in the communication interface 160 shown in FIG. 1. Additionally or alternatively, the interface 270, for example, may include a Mobile High-definition Link (MHL) interface, a secure digital (SD) card/MultiMedia Card (MMC) interface, or an Infrared Data Association (IrDA) interface.

The audio module 280 provides bidirectional conversion between a sound and an electronic signal. At least some elements of the audio module 280, for example, may be included in the input/output interface 140 shown in FIG. 1. The audio module 280, for example, may process sound information input or output via a speaker 282, a receiver 284, earphones 286, or the microphone 288.

The camera module 291 is a device that can take both still and moving images, and according to an embodiment of the present invention, may include one or more image sensors (e.g., a front sensor or a rear sensor), a lens, an Image Signal Processor (ISP), or a flash (e.g., a Light Emitting Diode (LED) or xenon lamp).

The power management module 295 manages power of the electronic device 200. The power management module 295, for example, may include a Power Management Integrated Circuit (PMIC), a charger IC, a battery, or fuel gauge.

The PMIC, for example, may be mounted in an IC or an SoC semiconductor. Charging methods may be classified into wired charging and wireless charging. The charger IC may charge a battery, and may prevent an overvoltage or excess current from being induced or flowing from a charger. According to an embodiment of the present invention, the charger IC may include a charger IC for at least one of wired charging and wireless charging. Examples of wireless charging include magnetic resonance charging, magnetic induction charging, and electromagnetic charging, and an additional circuit such as a coil loop, a resonance circuit, and a rectifier may be added for wireless charging.

The battery gauge, for example, may measure the residual capacity, charge in voltage, current, or temperature of the battery 296. The battery 296 may store or generate electricity, and may supply power to the electronic device 200 by using the stored or generated electricity. The battery 296, for example, may include a rechargeable battery or a solar battery.

The indicator 297 displays a specific status of the electronic device 200 or a part thereof (e.g., the AP 210), for example, a boot-up status, a message status, or a charging status. The motor 298 converts an electrical signal into a mechanical vibration. The electronic device 200 may include a processing unit (e.g., GPU) for supporting a mobile television (TV). The processing unit for supporting a mobile TV may process media data pursuant to a standard, for example, Digital Multimedia Broadcasting (DMB), Digital Video Broadcasting (DVB), or media flow.

Each of the above described elements of the electronic device 200 according to the present invention may be formed by one or more components, and the names of the corresponding elements may vary according to the type of the electronic device 200. The electronic device 200 according to the present invention may include at least one of the above described elements, and may exclude some of the elements or further include other additional elements. Further, some of the elements of the electronic device 200 according to the present invention may be coupled to form a single entity while performing the same functions as those of the corresponding elements before the coupling.

The term "module" as used in the present invention, for example, may mean a unit including one of hardware, software, and firmware or any combination of two or more of them. The "module", for example, may be interchangeable with the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present invention may include at least one of an Application-Specific Integrated Circuit (ASIC) chip, a Field-Programmable Gate Array (FPGA), and a programmable-logic device for performing operations, which are now known or will be developed in the future.

FIG. 3 is a block diagram of an image providing device 300 and a lens unit 310 according to an embodiment of the present invention. The image providing device 300 may be an electronic device having a component described in FIG. 2.

Referring to FIG. 3, the image providing device 300 displays an image. Such an image may be provided to a user via the lens unit 310.

According to an embodiment of the present invention, the lens unit 310 is a component of a Head Mounted Device (HMD). The HMD may have a holder. The image providing device 300 may be mounted to or separated from the holder. An image is displayed on a screen of the image providing device 300 mounted to the holder and the displayed image may be provided to the user via the lens unit 310.

According to an embodiment of the present invention, the lens unit 310 and the image providing device 300 may be components included in the HMD.

FIG. 4 illustrates an image providing device 410 and a holder 420 to which the image providing device 410 can be mounted according to an embodiment of the present invention. The image providing device 410 may be an electronic device (for example, a smart phone) having the components described in FIG. 2.

Referring to FIG. 4, the image providing device 410 may display a left eye image 411 and a right eye image 412 on a screen. The holder 420 includes a lens unit (that is, a left eye lens 430 and a right eye lens 440). Further, a slot 421 through which the image providing device 410 can be inserted into the holder 420 is provided on one side of the holder 420. Accordingly, the image providing device 410 may be inserted into the holder 420 via the slot 421. An image displayed on the screen of the image providing device 410 inserted into the holder 420 is transmitted to a user's eyes through lenses 430 and 440. The left eye image 411 is transmitted to the left eye through the left eye lens 430 and the right eye image 412 is transmitted to the right eye through the right eye lens 440.

The holder 420 in which the image providing device 410 can be mounted is not limited to the type illustrated in FIG. 4. According to an embodiment of the present invention, the slot 421 is formed on one surface of the holder 420 (for example, a surface facing a surface on which the lenses 430 and 440 are disposed) and the image providing device 410 can be inserted into the slot 421. Further, the holder 420 may include a cover which can cover the slot 421.

FIGS. 5a and 5b are a left side view and a right side view of an HMD 500 according to an embodiment of the present invention, respectively.

Referring to FIGS. 5a and 5b, the HMD 500 has the form of being worn on a user's head like glasses and includes a holder 510 and temple bows 520. A slot 511, in which an image providing device (for example, the image providing device 410) can be inserted into the holder 510, is provided on one side of the holder 510 (see FIG. 5a) and input units, for example, a button 512 and a touch pad 513, through which the user can control the image providing device inserted into the holder 510, are provided on the other side of the holder 510 (see FIG. 5b). In addition, a connection terminal which electrically and physically connects the input units and the image providing device is included in the holder 510. When the user presses the button 512, the image providing device may drive, for example, a camera to display a preview image on the screen.

FIG. 6 is a block diagram of an image providing device 600 according to an embodiment of the present invention. The image providing device 600 may be an electronic device having the components described in FIG. 2.

Referring to FIG. 6, the image providing device 600 includes a controller 610 for controlling components of the image providing device 600, a memory 620 for storing image data, voice data, text data, multimedia data and the like, a data processor 630 for processing stored data, a sensor unit 640 for sensing various pieces of external information, a graphics processing unit 650 for performing graphics processing, an image processor 660 for performing other image processing, and a display unit 670 for displaying a generated image.

The controller 610 (for example, the AP 210) analyzes image data (for example, 3D image data) and determines an inverse distortion rendering mode as a 1-pass mode or a 2-pass mode based on a result of the analysis. In a virtual space, an object may include a set of surfaces. A process of partitioning the object into a plurality of surfaces is generally referred to as a "tessellation" in a 3D image processing field and a program for executing the surface partition process is referred to as a "tessellation shader".

The analysis operation of the controller 610 includes a process of determining whether a surface partition degree (for example, the number of surfaces which can be partitioned from the object) can be calculated in image data. For example, the controller 610 may calculate (or predict) which object of virtual space objects moves and may calculate a movement direction of the moving object. The controller 610 determines whether the surface partition degree of the object can be calculated based on the movement direction of the object. For example, when any object moves in a depth direction (for example, a z-axis direction) in a virtual space of a 3D game, the controller 610 has difficulty in determining whether to perform the "surface partition process" when the object is close to a virtual viewpoint or the object is far away from the virtual viewpoint. The virtual viewpoint is defined as a user's viewpoint on a virtual space mapped to an actual space. The actual space is a space where the user and the display unit actually exist and the virtual space is a space where the object displayed through the display unit exists. When any object moves in a horizontal direction (for example, a Y-axis direction), the controller 610 relatively easily performs the "surface partition process". It is because a change in a distance between the virtual viewpoint and the object is less likely to happen when the object moves in the horizontal direction as compared to a case where the object moves in the depth direction.

When the surface partition degree can be calculated in the image data, the analysis operation of the controller 610 further includes a process of predicting the number of vertexes in the image data and a process of determining whether the predicted number of vertexes is greater than or equal to a reference. The vertexes are vertexes of a surface and may include x, y, and z coordinate values.

The controller 610 controls components (for example, the graphics processing unit 650 and the display unit 660) connected to the controller 610 according to a result of the determination of the inverse distortion rendering method. For example, when it is determined that the surface partition degree cannot be calculated, the controller 610 controls the graphics processing unit 650 to perform the 2-pass rendering. When the predicted number of vertexes is greater than or equal to the reference, even though it is determined that the surface partition degree can be calculated, the controller 610 controls the graphics processing unit 650 to perform the 2-pass rendering. When the predicted number of vertexes is less than the reference, the controller 610 controls the graphics processing unit 650 to perform the 1-pass rendering.

The graphics processing unit 650 processes image data (for example, 3D game data) stored in the memory 620 to perform the 1-pass rendering or the 2-pass rendering and outputs a "distorted image" to the display unit 670 as a result of the 1-pass rendering or the 2-pass rendering. The display unit 670 displays the distorted image on the screen.

According to an embodiment of the present invention, the graphics processing unit 650 may be a component included in the controller 610 (for example, the AP 210). Further, the graphics processing unit 650 may perform an operation of analyzing image data and determining the inverse distortion rendering mode as the 1-pass mode or the 2-pass mode on behalf of the controller 610.

FIGS. 7a to 7c are illustrations of a 2-pass rendering method according to an embodiment of the present invention.

Referring to FIG. 7a, the image providing device 600 performs a primary rendering process. Specifically, the controller 610 generates 3D image data 710 and transmits the generated 3D image data 710 to the graphics processing unit 650. The graphic processing unit 650 generates a flat image 720 by projecting the 3D image data 710 onto a plane.

Referring to FIG. 7b, the image providing device 600 performs a secondary rendering process. Specifically, the graphic processing unit 650 obtains an inverse distorted image 730 by rendering the flat image 720 in consideration of characteristics (for example, focal distance, magnification, distance between the screen and the lens and the like) of a lens unit (for example, the lens unit 310). The graphics processing unit 650 transmits the inverse distorted image 730 to the display unit 670. The display unit 670 displays the inverse distorted image 730 on the screen.

Referring to FIG. 7c, the inverse distorted image 730 is distorted to a flat image 740 by the lens unit 310 and then provided to the user.

FIGS. 8a and 8b are illustrations of a 1-pass rendering method according to an embodiment of the present invention. OpenGL for Embedded Systems (OpenGL ES) corresponding to graphic framework mainly used for a mobile device may recognize a 2D image as a 3D image which does not consider a Z coordinate based on the tessellation shader. Accordingly, an embodiment based on the 3D rendering is described below.

Referring to FIG. 8a, the image providing device 600 performs a 1-pass rendering process. Specifically, the controller 610 generates 3D image data 810 and transmits the generated 3D image data 810 to the graphics processing unit 650. The graphics processing unit 650 generates an inverse distorted image 820 by projecting the 3D image data 810 onto a plane in consideration of characteristics of the lens.

Referring to FIG. 8b, the inverse distorted image 820 is distorted to a flat image 830 by the lens unit 310 and then provided to the user.

Since the 1-pass rendering performs two image processing processes at one time, the 1-pass rendering has advantages, such as increased rendering speed, decreased current consumption and the like.

All objects included in image data may be expressed by a set of surfaces (for example, a triangle). In the 1-pass inverse distortion rendering, when image data is not partitioned into surfaces greater than or equal to a predetermined reference, distortion correction of the lens may be inaccurate. Accordingly, when it is predicted that the image data is not partitioned into surfaces greater than or equal to the reference, the image providing device 600 switches the inverse distortion rendering mode from the 1-pass mode illustrated in FIGS. 8a and 8b to the 2-pass mode illustrated in FIGS. 7a to 7c. When the image data is partitioned into surfaces greater than or equal to the reference but the surfaces correspond to a set of triangles having too many surfaces, calculations for the 1-pass inverse distortion rendering increase and thus problems may be generated in terms of capability and power consumption. For example, when it is predicted that the number of vertexes is greater than or equal to the reference, the image providing device 600 switches the inverse distortion rendering mode from the 1-pass mode to the 2-pass mode.

FIG. 9 is a flowchart illustrating an image processing method according to an embodiment of the present invention.

Referring to FIG. 9, in step 910, an electronic device, for example, the image providing device 600 determines whether a surface partition degree of the image data can be calculated. When it is determined that the surface partition degree cannot be calculated as a result of the determination, the image providing device 600 operates the inverse distortion rendering mode as the 2-pass mode in step 920.

When it is determined that the surface partition degree can be calculated as a result of the determination in step 910, the image providing device 600 predicts the number of vertexes in the image data in step 930. In step 940, the image providing device 600 determines whether the predicted number of vertexes is greater than or equal to the reference. When it is determined that the number of vertexes is greater than or equal to the reference as a result of the determination, the image providing device 600 operates the inverse distortion rendering mode as the 2-pass mode in step 920.

When the predicted number of vertexes is less than the reference as a result of the determination in step 940, the image providing device 600 performs the surface partition in step 950. In step 960, the image providing device 600 operates the inverse distortion rendering mode as the 1-pass mode by using surface partition information obtained as the result of step 950.

FIGS. 10*a* and 10*b* and FIGS. 11*a* and 11*b* illustrate a 1-pass inverse distortion rendering result and a 2-pass inverse distortion rendering result.

In the 1-pass mode, when there are not enough surface partition operations, the inverse distortion rendering may be inaccurate. However, when enough surface partition operations are performed (for example, when image data is partitioned into surfaces greater than or equal to a predetermined reference), there may be little difference between an inverse distorted image obtained through the 1-pass mode illustrated in FIG. 10*a* and an inverse distorted image obtained through the 2-pass mode illustrated in FIG. 10*b*. Further, when an object on a virtual space has a small number of vertexes and characters and lines correspond to straight lines from a virtual viewpoint (that is, a user's viewpoint on the virtual space), a result of the 1-pass mode illustrated in FIG. 11*a* may be comparatively clearer than a result of the 2-pass mode illustrated in FIG. 11*b*.

According to an embodiment of the present invention, an image processing method may comprise predicting the number of surfaces which can be partitioned in image data; determining an inverse distortion rendering method corresponding to the predicted result as a method for inverse distortion rendering of the image data; rendering the image data to a distorted image based on the determined inverse distortion rendering method; and displaying the distorted image. Predicting the number of surfaces comprises determining whether the number of surfaces which can be partitioned in the image data can be calculated; and predicting the number of vertexes in the image data when it is determined that the number of surfaces can be calculated, wherein the inverse distortion rendering method is determined based on the predicted number of vertexes. Determining the inverse distortion rendering method comprises determining the inverse distortion rendering method as a 2-pass mode when the predicted number of vertexes is greater than or equal to a reference; and determining the inverse distortion rendering method as a 1-pass mode when the predicted number of vertexes is less than the reference. Rendering the image data comprises primarily rendering the image data to a flat image and secondarily rendering the flat image to a distorted image when the inverse distortion rendering method is determined as the 2-pass mode; and partitioning the image data into a plurality of surfaces and rendering the image data to a distorted image by using surface partition information obtained as result of the partition when the inverse distortion rendering method is determined as the 1-pass mode. Determining the inverse distortion rendering method further comprises determining the inverse distortion rendering method as the 2-pass mode when it is determined that the number of surfaces cannot be calculated. Rendering of the image data further comprise partitioning the image data into a plurality of surfaces by using a tessellation shader.

According to an embodiment of the present invention, an electronic device comprises a memory for storing image data; a processor configured to predict the number of surfaces which can be partitioned in image data, determine an inverse distortion rendering method corresponding to a predicted result as a method for inverse distortion rendering of the image data, and render the image data to a distorted image based on the determined inverse distortion rendering method; and a display unit for displaying the distorted image. The processor may include at least one of an application processor and a graphics processing unit. The electronic device may be a Head Mounted Device (HMD) including a lens unit. The electronic device may further comprise a holder, wherein the display unit may be mounted to or separated from the holder.

According to an embodiment of the present invention, at least some of the devices (for example, modules or functions thereof) or the method (for example, operations) according to the present invention may be implemented by a command stored in a non-transitory computer-readable storage medium in a programming module form. When the instructions are executed by at least one processor (e.g., the processor 210), the at least one processor performs functions corresponding to the instructions. The non-transitory computer-readable storage medium may be, for example, the memory 220. At least a part of the programming module may be implemented (for example, executed) by, for example, the processor 210. At least some of the programming modules may include, for example, a module, a program, a routine, a set of instructions or a process for performing one or more functions.

The non-transitory computer-readable recording medium may include magnetic media such as a hard disk, a floppy disk, and a magnetic tape, optical media such as a Compact Disc Read Only Memory (CD-ROM) and a Digital Video Disc (DVD), magneto-optical media such as a floptical disk, and hardware devices specially configured to store and perform a program instruction (for example, programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

The programming module according to the present invention may include one or more of the aforementioned components or may further include other additional components, or some of the aforementioned components may be omitted. Operations executed by a module, a programming module, or other component elements according to various embodiments of the present invention may be executed sequentially, in parallel, repeatedly, or in a heuristic manner. Further, some operations may be executed according to another order or may be omitted, or other operations may be added.

The embodiments disclosed in the specification and drawings are merely presented to easily describe technical contents of the present invention and facilitate understanding of the present invention and are not intended to limit the scope of the present invention. Therefore, all changes or modifications derived from the technical idea of the present invention as well as the embodiments described herein should be interpreted to belong to the scope and spirit of the present invention as defined by the appended claims and their equivalents.

The invention claimed is:

1. A method of processing an image in an electronic device, the method comprising:
   determining, by a processor of the electronic device, whether a number of surfaces which can be partitioned in image data can be calculated, the image data being stored in a memory of the electronic device;
   predicting a number of vertexes in the image data when it is determined that the number of surfaces can be calculated;
   determining, by the processor, an inverse distortion rendering method for inverse distortion rendering of the image data based on the predicted number of vertexes;
   rendering, by the processor, the image data to a distorted image based on the determined inverse distortion rendering method; and
   displaying, by a display of the electronic device, the distorted image,
   wherein the inverse distortion rendering method is determined as a 2-pass mode when the predicted number of vertexes is greater than or equal to a reference, and the inverse distortion rendering method is determined as a 1-pass mode when the predicted number of vertexes is less than the reference.

2. The method of claim 1, wherein
rendering the image data comprises:
   first rendering the image data to a flat image and then rendering the flat image to a distorted image when the inverse distortion rendering method is determined as the 2-pass mode; and
   partitioning the image data into a plurality of surfaces and rendering the image data to a distorted image by using surface partition information obtained as result of the partition when the inverse distortion rendering method is determined as the 1-pass mode.

3. The method of claim 2, wherein determining the inverse distortion rendering method further comprises determining the inverse distortion rendering method as the 2-pass mode when it is determined that the number of surfaces cannot be calculated.

4. The method of claim 2, wherein rendering the image data further comprises partitioning the image data into a plurality of surfaces by using a tessellation shader.

5. The method of claim 1, wherein the image data is 3D image data.

6. An electronic device comprising:
   a memory for storing image data;
   a processor configured to:
      determine whether a number of surfaces which can be partitioned in the image data can be calculated,
      predict a number of vertexes in the image data when it is determined that the number of surfaces can be calculated,
      determine an inverse distortion rendering method for inverse distortion rendering of the image data based on the predicted number of vertexes, and
      render the image data to a distorted image based on the determined inverse distortion rendering method; and
   a display unit for displaying the distorted image,
   wherein processor is configured to determine the inverse distortion rendering method as a 2-pass mode when the predicted number of vertexes is greater than or equal to a reference, and determine the inverse distortion rendering method as a 1-pass mode when the predicted number of vertexes is less than the reference.

7. The electronic device of claim 6, wherein the processor includes at least one of an application processor and a graphics processing unit.

8. The electronic device of claim 6, wherein the electronic device is a Head Mounted Device (HMD) that further comprises a lens unit.

9. The electronic device of claim 8, further comprising a holder, wherein the display unit is mounted to or separated from the holder.

10. The electronic device of claim 6, wherein the processor is further configured to first render the image data to a flat image and then render the flat image to a distorted image when the inverse distortion rendering method is determined as the 2-pass mode, and to partition the image data into a plurality of surfaces and render the image data to a distorted image by using surface partition information obtained as result of the partition when the inverse distortion rendering method is determined as the 1-pass mode.

11. The electronic device of claim 6, wherein the processor is configured to first render the image data to a flat image and then render the flat image to a distorted image when it is determined that the number of surfaces cannot be calculated.

12. The electronic device of claim 6, wherein the image data is 3D image data.

13. A non-transitory computer-readable recording medium including a program for executing a process comprising:
   determining whether a number of surfaces which can be partitioned in image data can be calculated;
   predicting a number of vertexes in the image data when it is determined that the number of surfaces can be calculated;
   determining an inverse distortion rendering method for inverse distortion rendering of the image data based on the predicted number of vertexes;
   rendering the image data to a distorted image based on the determined inverse distortion rendering method; and
   displaying the distorted image,
   wherein the inverse distortion rendering method is determined as a 2-pass mode when the predicted number of vertexes is greater than or equal to a reference, and the inverse distortion rendering method is determined as a 1-pass mode when the predicted number of vertexes is less than the reference.

* * * * *